United States Patent [19]

Hashimoto

[11] 3,914,539

[45] Oct. 21, 1975

[54] AUTOMATIC RECEPTION SYSTEM FOR FACSIMILE RECEIVER

[75] Inventor: Takemi Hashimoto, Yokohama, Japan

[73] Assignee: Ricoh Co., Ltd., Tokyo, Japan

[22] Filed: Dec. 28, 1973

[21] Appl. No.: 429,148

[30] Foreign Application Priority Data

Dec. 31, 1972 Japan .................................. 47-301

[52] U.S. Cl. .................................. 178/6; 178/6.6 R

[51] Int. Cl.² .......................................... H04N 1/22

[58] Field of Search .... 178/6.6 DC, 6, 6.6 R, 4.1 C, 178/4.1 B, 4.1 A, 4.1 R; 179/2 DP, 2 C

[56] References Cited

UNITED STATES PATENTS

| | | | |
|---|---|---|---|
| 2,353,631 | 7/1944 | Bliss | 178/6.6 DC |
| 3,444,315 | 5/1969 | Shimabukuro | 178/6 |
| 3,529,076 | 9/1970 | Sobotta | 178/4.1 R |
| 3,678,179 | 7/1972 | Serracchioli | 178/4.1 R |
| 3,745,251 | 7/1973 | Fretwell | 179/2 DP |
| 3,751,582 | 8/1973 | Wernikoff | 178/6 |
| 3,751,583 | 8/1973 | Lemelson | 178/6 |

*Primary Examiner*—Howard W. Britton
*Assistant Examiner*—Michael A. Masinick
*Attorney, Agent, or Firm*—Cooper, Dunham, Clark, Griffin & Moran

[57] ABSTRACT

A system for automatically activating a facsimile receiver in response to a call signal is disclosed. In response to a call signal from a facsimile transmitter, a closed DC loop of a telephone subscriber line is established and a power supply circuit is energized, and in response to a status signal transmitted after the call signal, the facsimile receiver is set into a desired reception mode so that video information may be automatically received and the transmitted images or pictures may be reproduced at the receiver. When the reception of video information is completed, the closed DC loop is automatically opened and the power supply circuit is also automatically de-energized. Furthermore, if a malfunction of a recorder or printer in the facsimile receiver should occur, the received video information is switched to be transferred to a magnetic tape recorder. Therefore, after the malfunction of the printer has been remedied, the printer may reproduce the images or pictures from the video information recorded on the magnetic tape.

10 Claims, 13 Drawing Figures

AUTOMATIC RECEPTION SYSTEM FOR FACSIMILE RECEIVER

BACKGROUND AND SUMMARY OF THE INVENTION

The present invention relates to a facsimile communication system and more particularly an automated facsimile receiver of the type using a telephone subscriber line.

There has been proposed an automated facsimile system utilizing a telephone subscriber line in which a facsimile transmitter may call the facsimile receiver at any desired time so that the desired images or pictures may be automatically transmitted and received. The advantage of this system resides in the fact that facsimile transmission is possible at reduced toll charges during the night even when an operator is not present. The conventional automatic facsimile receiver incorporates not only a recorder or printer such as an electrostatic recorder but also a magnetic tape recorder in order to record the transmitted facsimile inforrmation for the reproduction of a plurality of information but it does not have a means adapted to automatically switch the transfer of the received data from the recorder or printer to the magnetic tape recorder depending upon the conditions of the printer. Furthermore, the conventional automatic facsimile receiver must be always turned on so that it may automatically answer or respond to the call from the transmitter at any time. As described above, the conventional automatic facsimile receiver is not satisfactory in practice.

One of the objects of the present invention is therefore to provide an improved automatic facsimile receiver.

Another object of the present invention is to provide an improved automatic reception system for a facsimile receiver which may automatically switch the transfer of the received facsimile or data information from a printer to a magnetic tape recorder depending upon the occurrence of a selected condition, e.g. printer, the absence of recording paper.

A further object of the present invention is to provide an automatic reception system for a facsimile receiver which may automatically turn on a power supply circuit in response to the call signal transmitted from a facsimile transmitter and also turn off said power supply circuit upon the completion of the reception of the facsimile or video information.

Briefly stated, according to the present invention in response to the detection of a call signal of 16Hz transmitted from a facsimile transmitter, a DC closed loop of a telephone subscriber line is automatically established and a power supply circuit is also automatically turned on. Thereafter, a facsimile receiver is automatically set into a desired reception mode in response to a status signal which is received after the call signal and designates the resolution, the reception speed, types of the recording media such as recording paper, magnetic tape and the like, the size of recording paper and so on. After the video information is received, the power supply circuit is automatically turned off and the DC closed loop is also automatically opened. The system incorporates further a first detector for detecting an error in a transmission system and a second detector adapted to detect the mechanical malfunction of a facsimile receiver so that not only the power circuit is turned off but also the DC closed loop is opened if any error is detected. Furthermore, if an error is detected while the images or pictures are being reproduced on a recording paper, the video information is automatically recorded by a magnetic tape recorder so as to prevent loss of the received video information.

The above and other objects, features and advantages of the present invention will become more apparent from the following description of one preferred embodiment thereof taken in conjunction with the accompanying drawings.

DESCRIPTION OF THE PREFERRED EMBODIMENT

Figures 1, 1A:
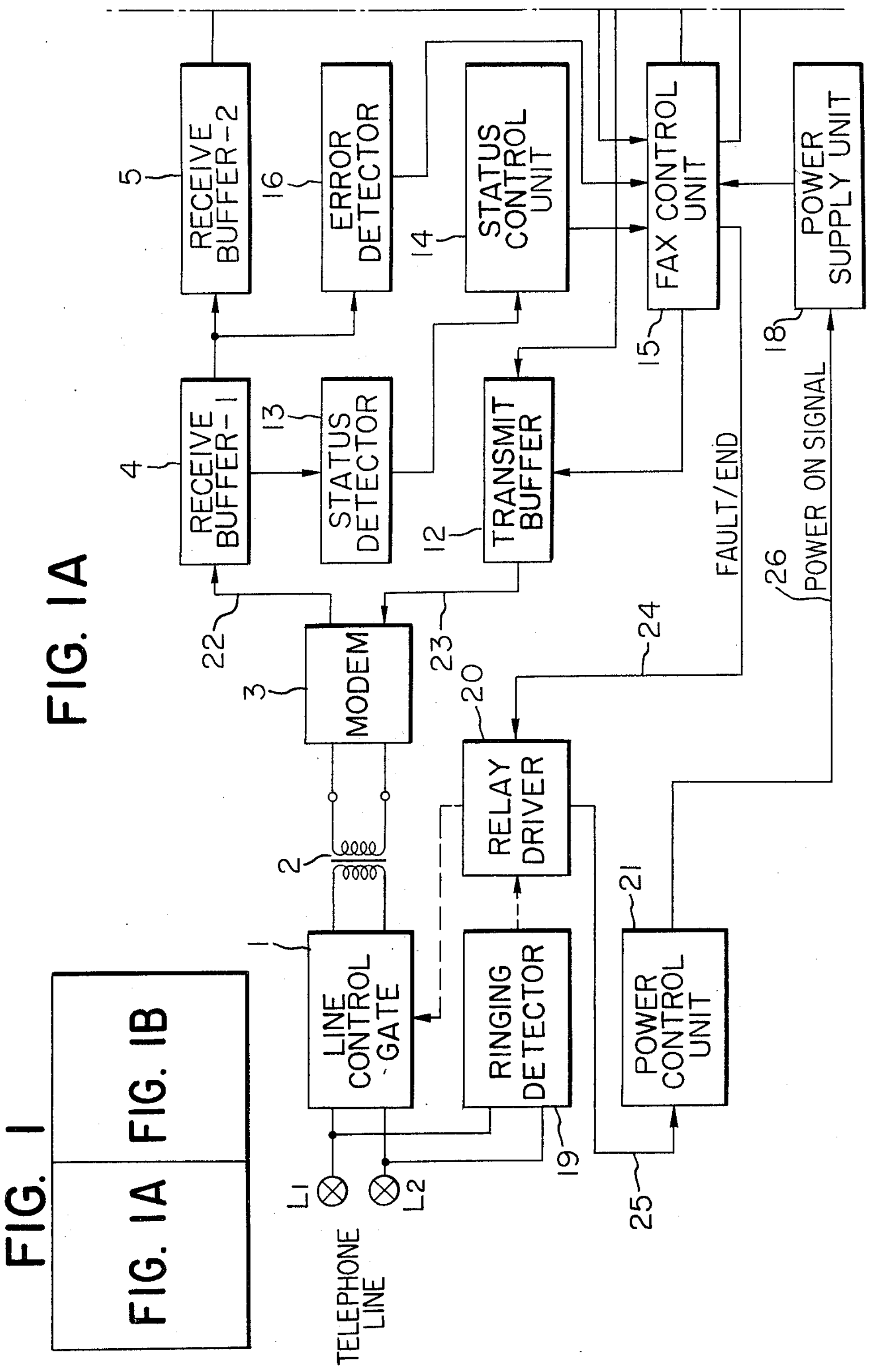
FIGS. 1, 1A, and 1B are block diagrams of the preferred embodiment of an automatic reception system for a facsimile receiver in accordance with the present invention.
Figure 1B:
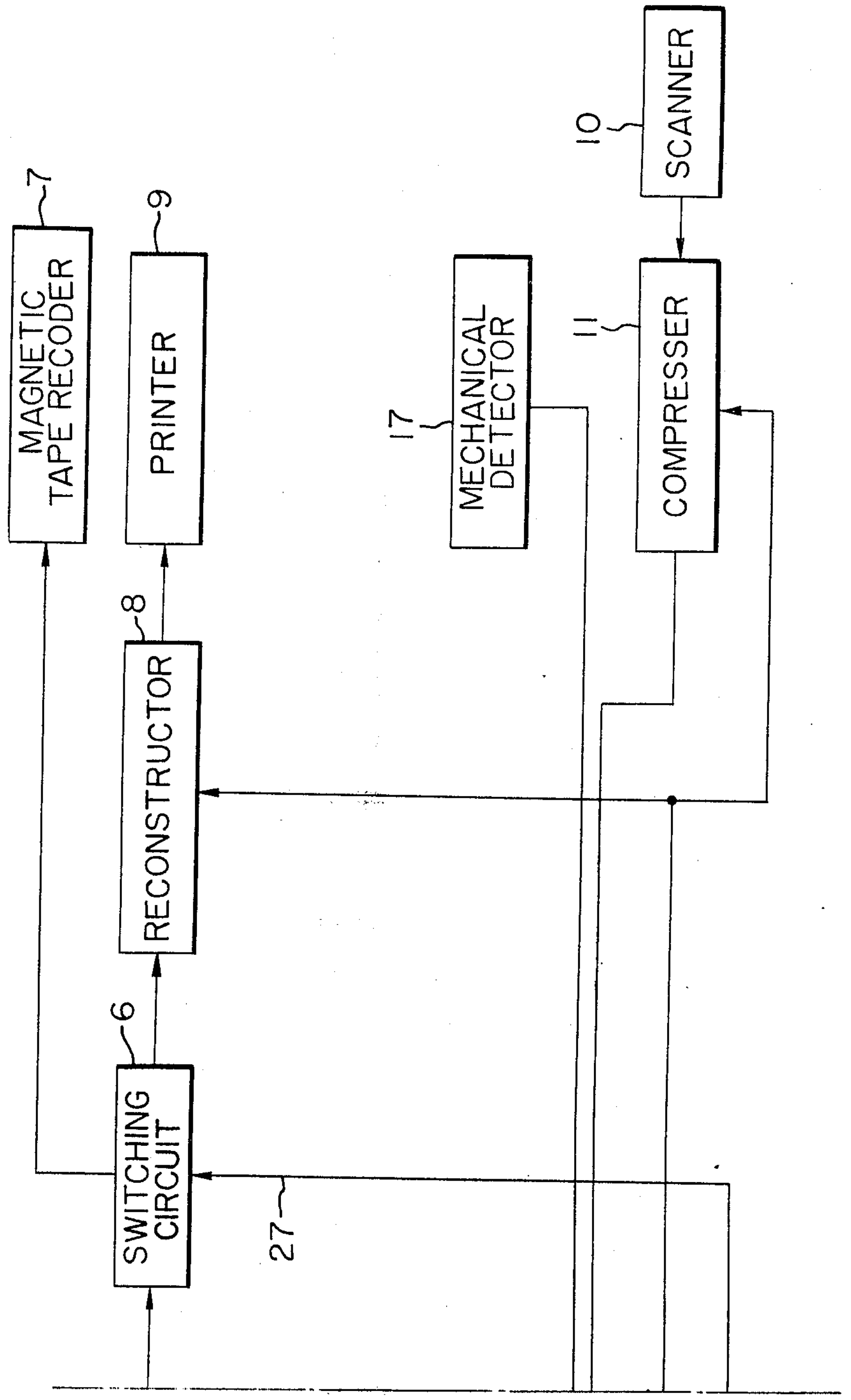

A pair of conventional telephone subscriber lines $L_1$ and $L_2$ are connected through a line control gate 1 and a coupling transformer 2 to a modem 3 which is adapted to transform the data transmitted through the subscriber lines $L_1$ and $L_2$ into signals which may be used by a facsimile system and to transform the output signal of the facsimile system into signals adapted to be transmitted through the subscriber lines $L_1$ and $L_2$. The line control gate 1 includes a line switch adapted to turn on or off the facsimile receiver. The output of the modem 3 is transmitted through an output line 22 to a data reception system or facsimile receiver consisting of a pairs of receive buffers 4 and 5 adapted to temporarily store therein the received data, a switching circuit 6, a reconstructor 8 for decoding the received data into the original video information, and a printer 9 which reproduces the original images or pictures based upon the reconstructed video information. The data transmission system consists of a scanner 10, a compressor 11 which compresses the video output of the scanner 10, a transmit buffer 12 for temporarily storing therein the data to be tramsmitted and a line 23 through which the output of the transmit buffer 12 is transmitted to the modem 3. Since the data transmission system is not directly related with the present invention, further description thereof will not be made in this specification.

In order to control automatically a facsimile receiver or transmitter from a distance, a status signals must be transmitted ahead of the facsimile data to a facsimile receiver so that the latter may be switched into a mode depending upon the desired resolution, whether a magnetic tape or recording paper is to be used for reception, and the desired size of a recording paper when the latter is used. For this purpose, a status detector 13 is inserted which is connected to a status control unit 14 connected to a facsimile control unit 15 which switches the facsimile unit into the transmission mode or reception mode and selects a magnetic tape recorder 7 or the printer 9 in case of the reception mode which is described in more detail hereinafter. The facsimile control unit 15 further communicates with an error detector 16 and a mechanical detector 17, the former being adapted to detect errors produced in the transmission system and the latter to detect mechanical errors in the facsimile unit. Therefore the facsimile control unit 15 controls the connection or disconnection of the transmission line, the on-off operation of a power supply unit 18 and other controls in response to the signals from the error detectors 16 and 17 as will be described in more detail hereinafter.

The subscriber lines $L_1$ and $L_2$ are also connected to a ringing detector 19 which detects the call signal of 16Hz. A relay driver 20, which controls the line control gate 1, is energized in response to the output of the ringing detector 19 and is de-energized in response to a FAULT or END signal transmitted through a line 24 from the facsimile control unit 15. The relay driver 20 is connected through a line 25 to a power control unit 21 which controls the on-off operation of the power supply unit 18 in response to the output signal from the relay driver 20.

Next the general mode of operation the automatic facsimile reception system with the above construction will be described hereinafter. When the incoming signal is received, the ringing detector 19 is actuated in response to the call signal of 16Hz to energize the relay driver 20 so that the line control gate 1 is turned on. Therefore, the subscriber lines $L_1$ and $L_2$ are connected through the line control gate 1 to the facsimile receiver. That is, a DC closed loop is established between the subscriber lines $L_1$ and $L_2$ and the coupling transformer 2. In response to the output of the relay driver 20, the power control unit 21 turns on the power supply unit so that power is supplied to the facsimile receiver and other units. Thereafter, the initial condition of the facsimile receiver unit is checked. That is, when the facsimile receiver is in the reception mode, an answer signal is transmitted to the calling facsimile transmitter (not shown) through the subscriber lines $L_1$ and $L_2$, and the transmitter transmits a status signal designating the reception speed, the reception mode, the recording medium, that is the tape recorder 7 or the printer 9, and the recording paper size.

The status signal is detected by the status detector 13, the output of which is transferred to the status control unit 14. In response to the output signal from the unit 14, the facsimile control unit 15 generates the control signal to set the facsimile unit into the reception mode. When the facsimile unit has been set into the reception mode, a signal representing that the facsimile unit is ready to receive the video information is transmitted to the transmitter. Then, the transmitter starts the transmission of video information.

The received video information is demodulated by the modem 3, then stored into the buffers 4 and 5, transmitted through the switching circuit 6, and reconstructed or expanded by the reconstructor 8 so that normally the printer 9 reproduces the transmitted images or pictures.

When errors in the received information are detected by the error detector 16 or when a mechanical malfunction of the facsimile receiver is detected by the mechanical error detector 17, the facsimile control unit 15 transmits a FAULT signal through the line 24 to the relay driver 20 so that the latter is de-energized to turn off the line control gate 1. Therefore, the subscriber lines $L_1$ and $L_2$ are disconnected from the facsimile unit, and at the same time the power control unit 21 turns off the power supply unit 18 in response to the de-energization of the relay driver 20. The FAULT signal is also transmitted to the relay driver 20 when the facsimile unit is not in the reception mode when the incoming signal is received so that the line control gate 1 and the power supply unit 18 are also turned off.

When a malfunction or error, such as running out of recording paper and/or developing agent, occurs in the printer 9 so that reproduction becomes impossible, the control unit 15 transmits a switching signal through a line 27 to the switching circuit 6 so that the second buffer 5 is connected to the magnetic tape recorder 7. Therefore, the received video information may be recorded on the tape and may be played back later to reproduce the images or pictures after the malfunction of the printer 9 has been remedied.

Upon completion of the reception of all data transmitted, the facimile control unit 15 generates an END signal so that the relay driver 29 is de-energized. Therefore, the line control gate 1 and the power supply unit 18 are turned off in the manner described above.

Figure 2:
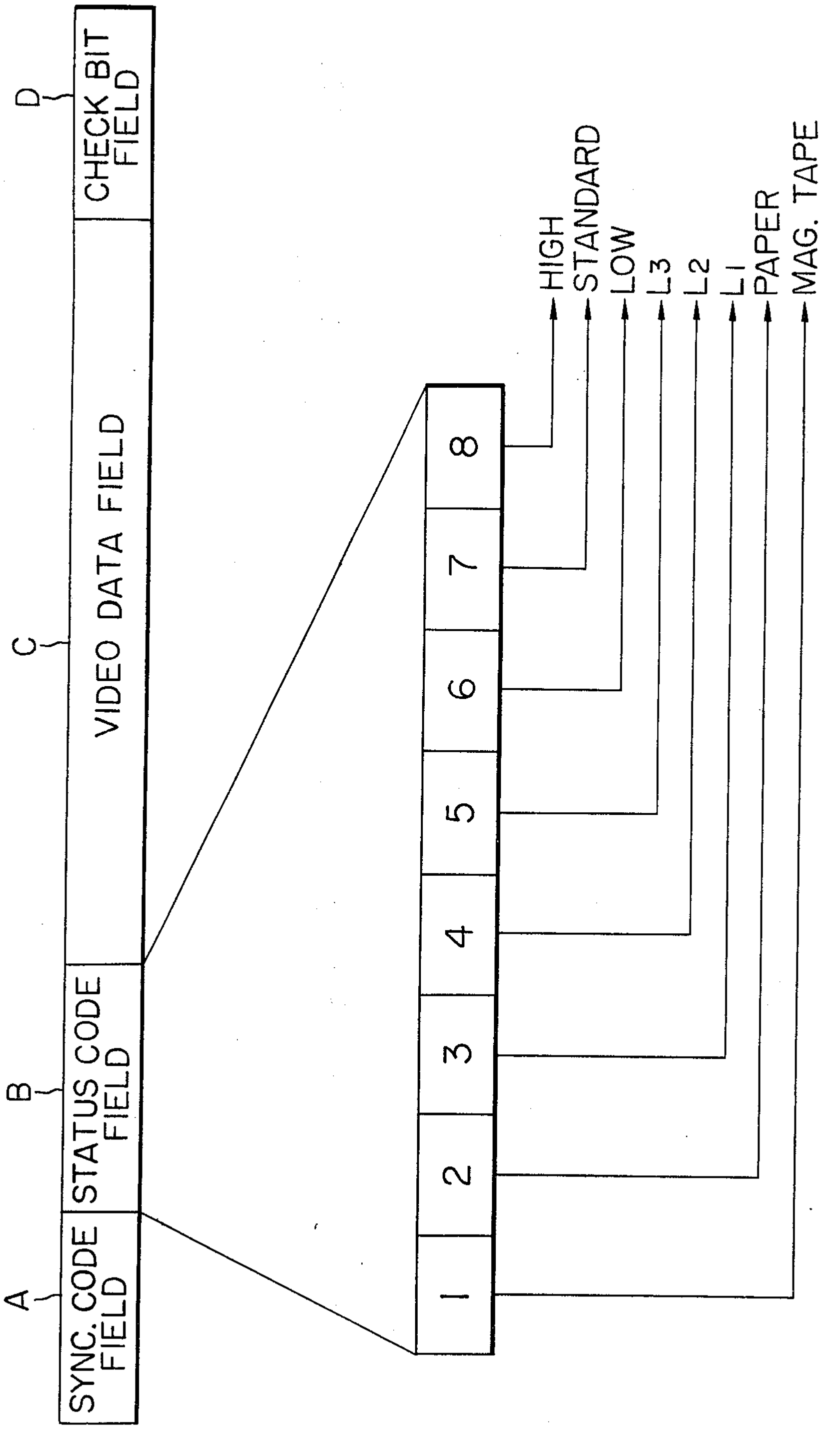
FIG. 2 shows one example of a format of one block of transmitted data.

As shown in FIG. 2, one block of data transmitted from the transmitter consists of a sync code or field A representing the start of a new block of data, a status code field B designating the resolution, the size of the recording paper to be used, the transmission speed and other information for setting the facsimile receiver unit into a desired mode, a video information field C, and a check bit field D used for the parity check of each block of data.

Referring back to FIG. 1, the one block of transmitted data as shown in FIG. 2 is stored in the first buffer 4, and the status code in the field B is detected by the status detector 13. When the data are transferred from the buffer 4 into the buffer 5, they are also transferred into the error detector 16 so that an error in the received data may be detected based upon the parity check code in the field D.

The status code field B consists of, for instance, eight bits. The first and second bits are used to designate whether magnetic tape or recording paper is to be used for reception. For instance, when the first bit is 1, the magnetic tape is selected, while the recording paper is selected when the second bit is 1. The third, fourth and fifth bits are used to designate the resolution, that is the number of scanning lines per unit length. For instance, when the third bit is 1, the resolution is $L_1$ lines per mm, and when the fourth and fifth bits are 1s, the resolutions are $L_2$lines per mm and $L_3$ lines per mm, respectively. The sixth, seventh and eighth bits are used to designate the transmission speed. It is to be understood that the data format shown in FIG. 2 is only one example. In the case of the data format shown in FIG. 2, the data field C is not used when the status code is transmitted. In like manner, the status code field B is not used when data is transmitted in the data field C. This means that the bit length in one block is always constant, whether the status code or the video information is transmitted, so that the control system of the facsimile unit may be considerably simplified.

Figures 3, 3B:
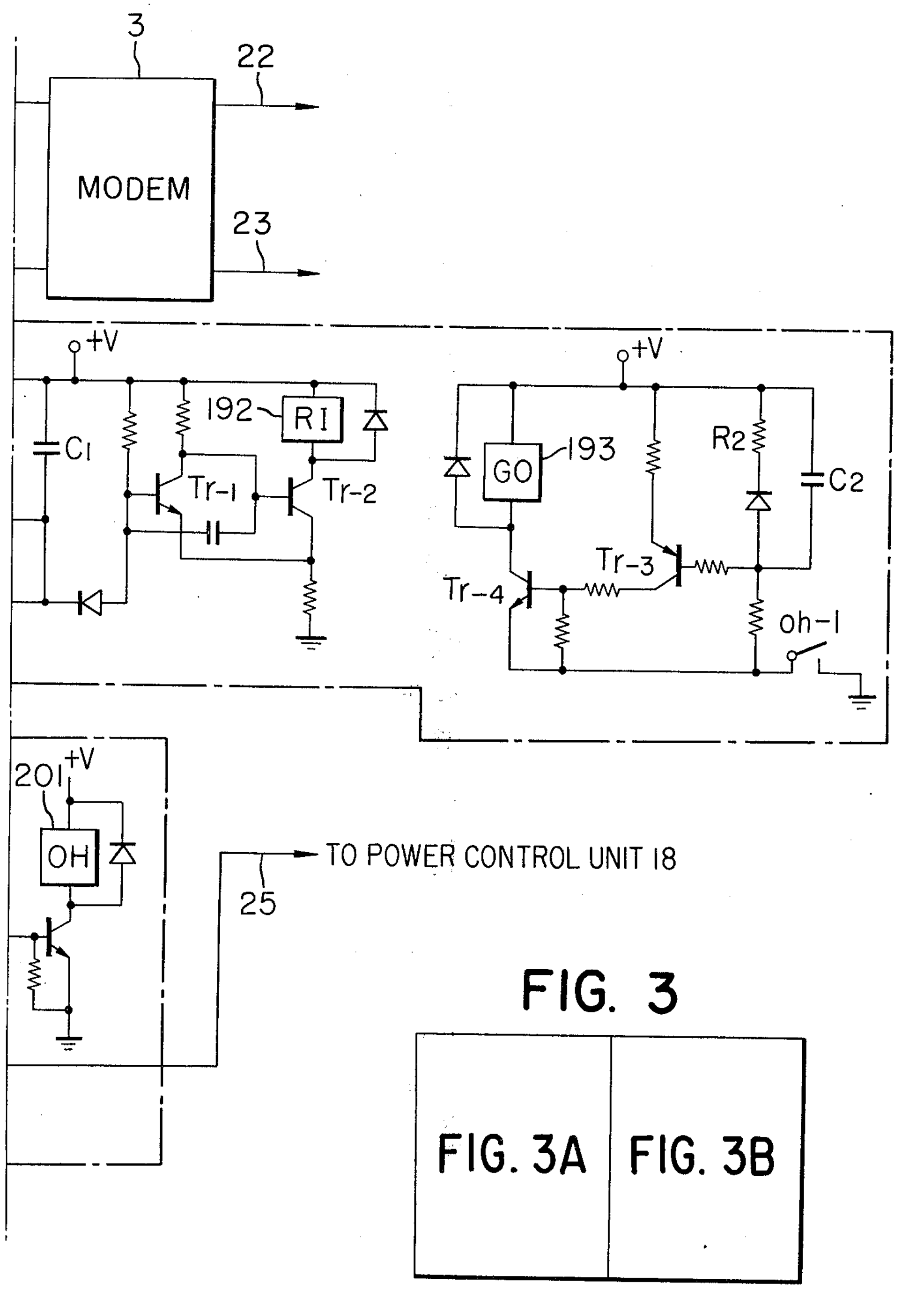
FIGS. 3, 3A, and 3B are detailed diagrams of a ringing detector and a relay driver shown in FIG. 1.
Figure 3A:
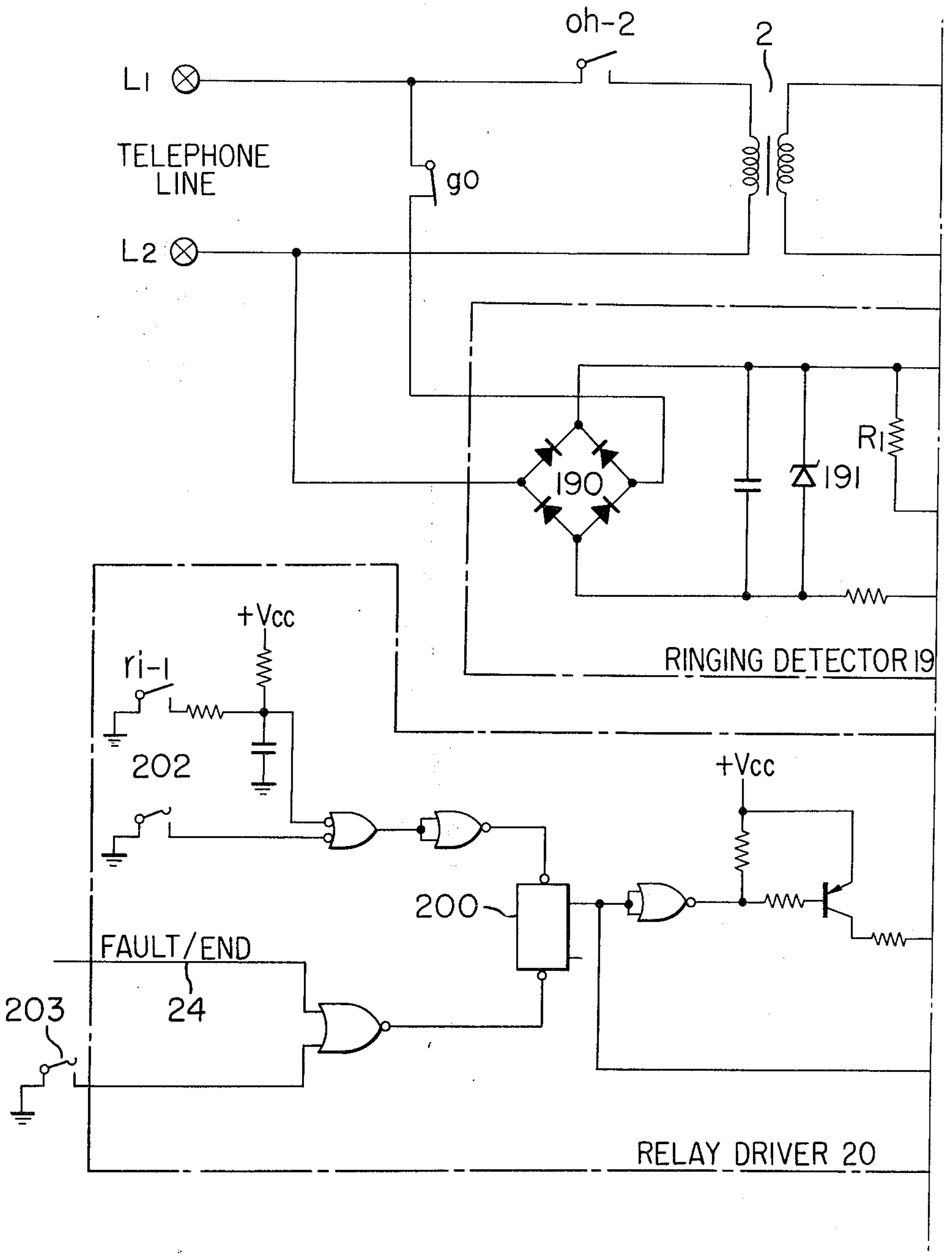

Next the principal units shown in FIG. 1 will be described in more detail hereinafter. First referring to FIG. 3 illustrating in detail the line control gate 1, the ringing detector 19, and the relay driver 20, the call signal of 16Hz transmitted through the lines $L_1$ and $L_2$ is rectified by a rectifier 190 so that the corresponding DC voltage is applied across a zener diode 191. Therefore, after a time interval which is dependent upon the time constant of a resistor $R_1$ and capacitor $C_1$, a transistor $Tr_1$ is turned off while a transistor $Tr_2$ is turned on so that a RI relay 192 is energized. As a result, an armature $RI_1$ of the relay 192 in the relay driver 20 is closed to set a flip-flop 200 so that transistors $Tr_5$ and $Tr_6$ are turned on to energize an OH relay 201. As a result the contacts $OH_1$ and $OH_2$ in the ringing detector 19 are closed so that transistors $Tr_3$ and $Tr_4$ are turned on after a predetermined time to energize a GO relay 193, thereby opening its contact go. Thus, the DC closed loop of the subscriber lines $L_1$ and $L_2$ is established. In this case, the time when the contact go is opened after the contact $OH_2$ is closed is dependent upon the time constant of a time constant circuit consisting of a resistor $R_2$ and a capacitor $C_2$.

The flip-flop 200 is reset in response to the FAULT or END signal transmitted through the line 24 so that the transistors $Tr_5$ and $Tr_6$ are turned off. The relay 201 is de-energized to open the contacts $OH_1$ and $OH_2$. The transistors $Tr_3$ and $Tr_4$ are also turned off to close the contact go. The flip-flop 200 may be set and reset by a manual start button 202 and a manual end button 203, respectively. The set and reset outputs of the flip-flop 200 are transmitted through the line 25 to the power control unit 21.

Figure 4:
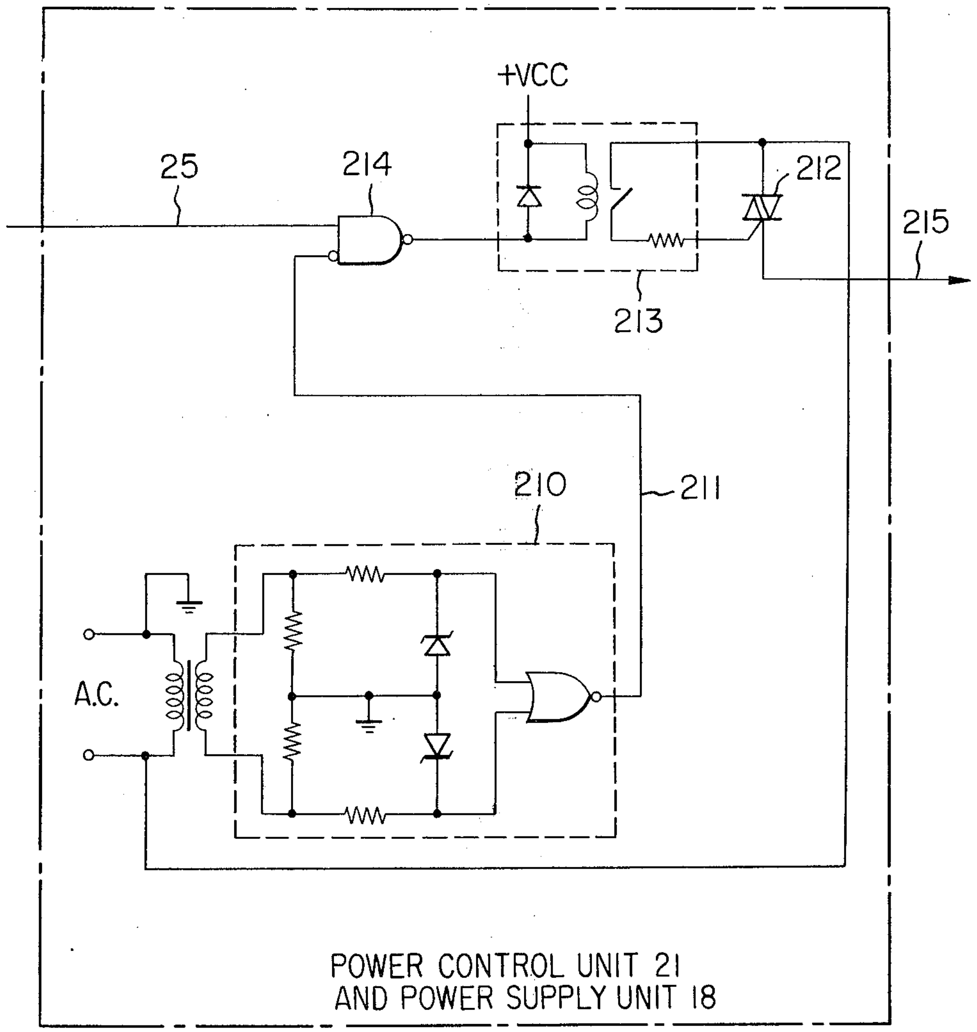
FIG. 4 is a detailed diagram of a power control unit shown in FIG. 1.

Next referring to FIG. 4, the power control unit 21 and the power supply unit 18 will be described in detail hereinafter. A zero-level-crossing detecting circuit 210 is of a conventional type generating the signal 0 on a line 211 whenever the AC input voltage crosses the zero level. A trigger circuit 213 generates a trigger signal to energize a bidirectional gate element 212. When the signal on the line 25 is at a low level, an AND gate 214 provides no output so that the bidirectional gate element 212 is not energized. As a result the AC input is not transmitted to an output line 215. When the flip-flop 200 in the relay driver 20 is set, the signal on the line 25 rises to a high level so that the AND gate 214 provides the output whenever the AC input crosses the zero level. The gate element 212 is energized in response to the trigger signal generated by the trigger circuit 213 so that the AC input may be transmitted through the gate element 212 to the output line 215, which is the power line to the facsimile unit. When the signal on the line 215 falls to a low level, the trigger circuit 213 is de-energized so that the AC input is not transmitted to the output line 215.

Figures 5, 5B:
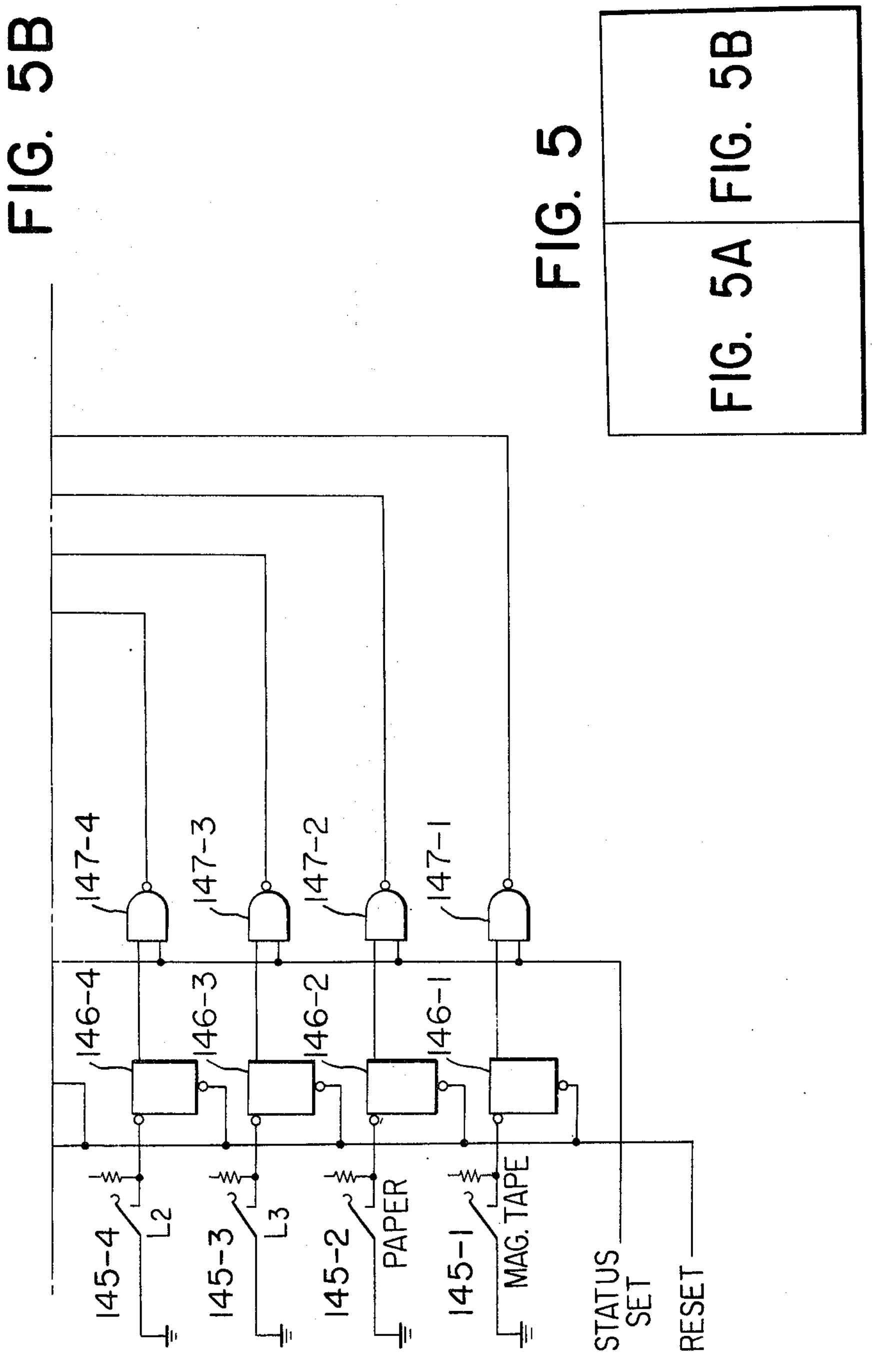
FIGS. 5, 5A and 5B are detailed diagrams of a status control unit shown in FIG. 1.
Figure 5A:
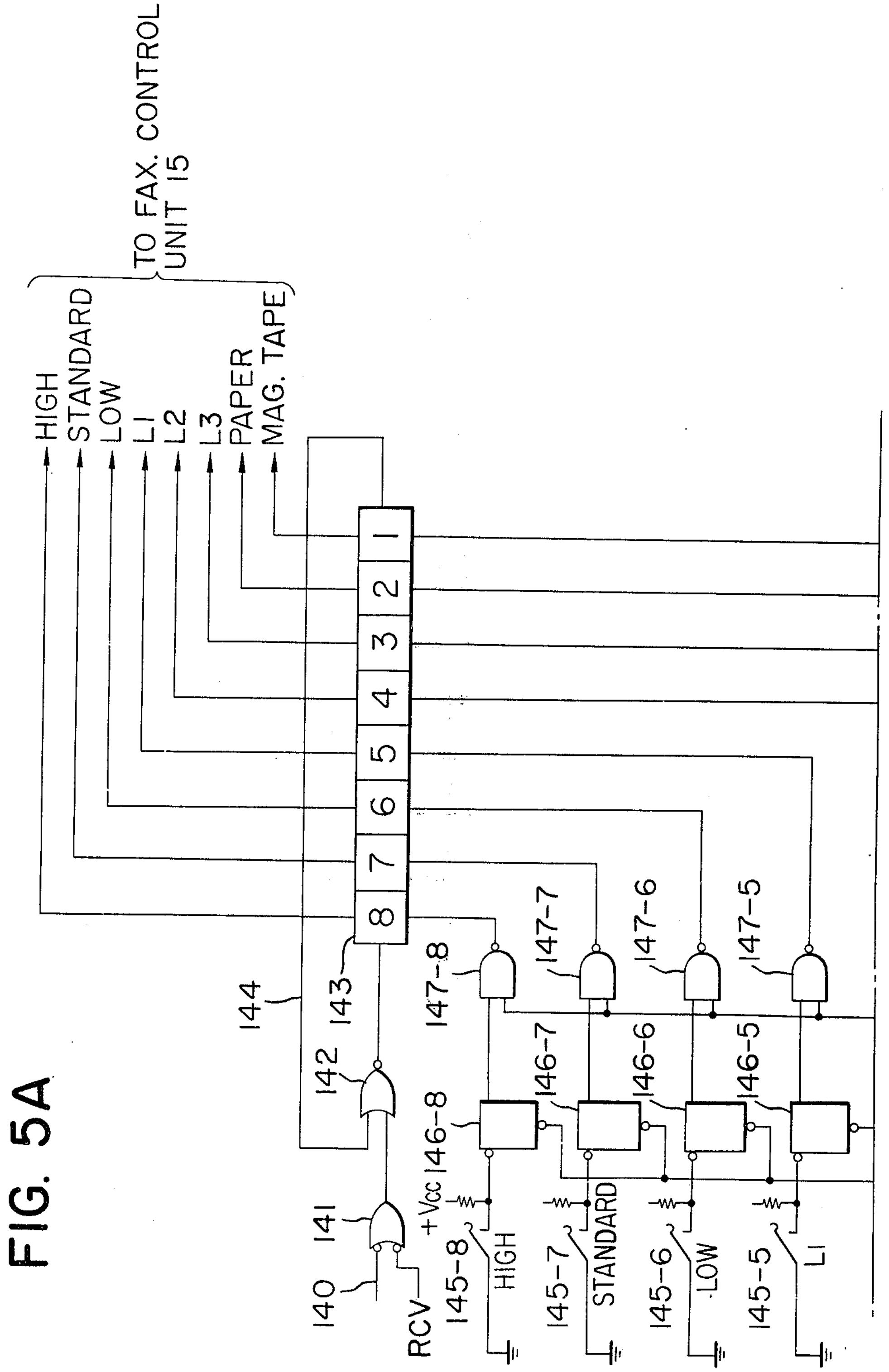

Next referring to FIG. 5, the status control unit 14 will be described in more detail hereinafter. When the facsimile unit is in the reception mode, an RCV signal is applied to a gate 141 so that the status signal or code detected by the status detector (See FIG. 1) may be transmitted through a line 140 and gates 141 and 142 to a shift register 143 having 8 bits in order to process the format shown in FIG. 2. The content in the shift register 143 is not only transferred into the facsimile control unit 15 but also circulated through a circulation line 144 and the gate 142. In order to manually set the shift register 143 into a desired mode, switches $145_1$ to $145_8$ may be used. The ON-OFF conditions of the manual switches $145_1$ to $145_8$ are once held in flip-flops $146_1$ to $146_8$ and then set into the shift register 143 through gates $147_1$ to $147_8$ when the status set signal is simultaneously applied to the gates $147_1$ to $147_8$. The flip-flops $146_1$ to $146_8$ are reset in response to a reset signal RESET.

Figure 6:
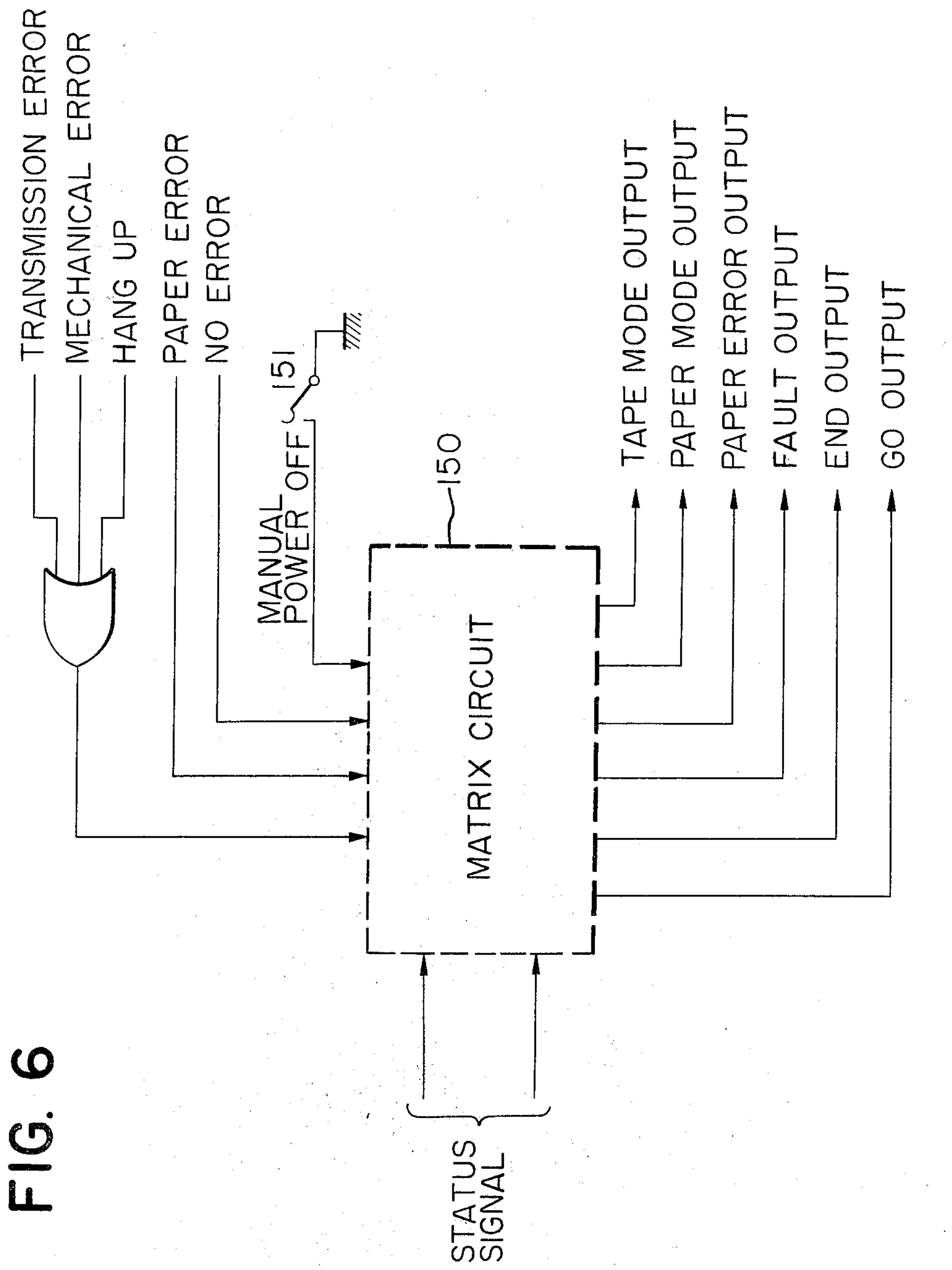
FIG. 6 is a diagram of a facsimile control unit shown in FIG. 1.

Next referring to FIG. 6, the facsimile control unit 15 will be described in detail hereinafter. The status signals are applied as inputs to the horizontal lines of a matrix circuit 150 from the status control unit 14 while the transmission error signal from the error detector 16, the mechanical malfuction signal from the second error detector 17, the hang-up signal, the paper error signal, and so on are applied to the vertical lines of the matrix 150. In addition to the above signals, the manual power OFF signal is also applied to the matrix circuit 150 by a switch 151 in order to turn off manually the power supply unit 18. Therefore, various control signals are provided by the combinations of the input signals. In practice, more input and output lines are of course connected to the matrix circuit 151. The mode of operation of the control unit 15 will be described when for instance the paper error signal occurs, representing the occurence of an error in the printer 9. In response to the paper error signal, the matrix circuit 150 provides the paper error signal which is transmitted to the switching circuit 6 so as to control it in the manner described hereinbefore with reference to FIG. 1.

Figure 7:
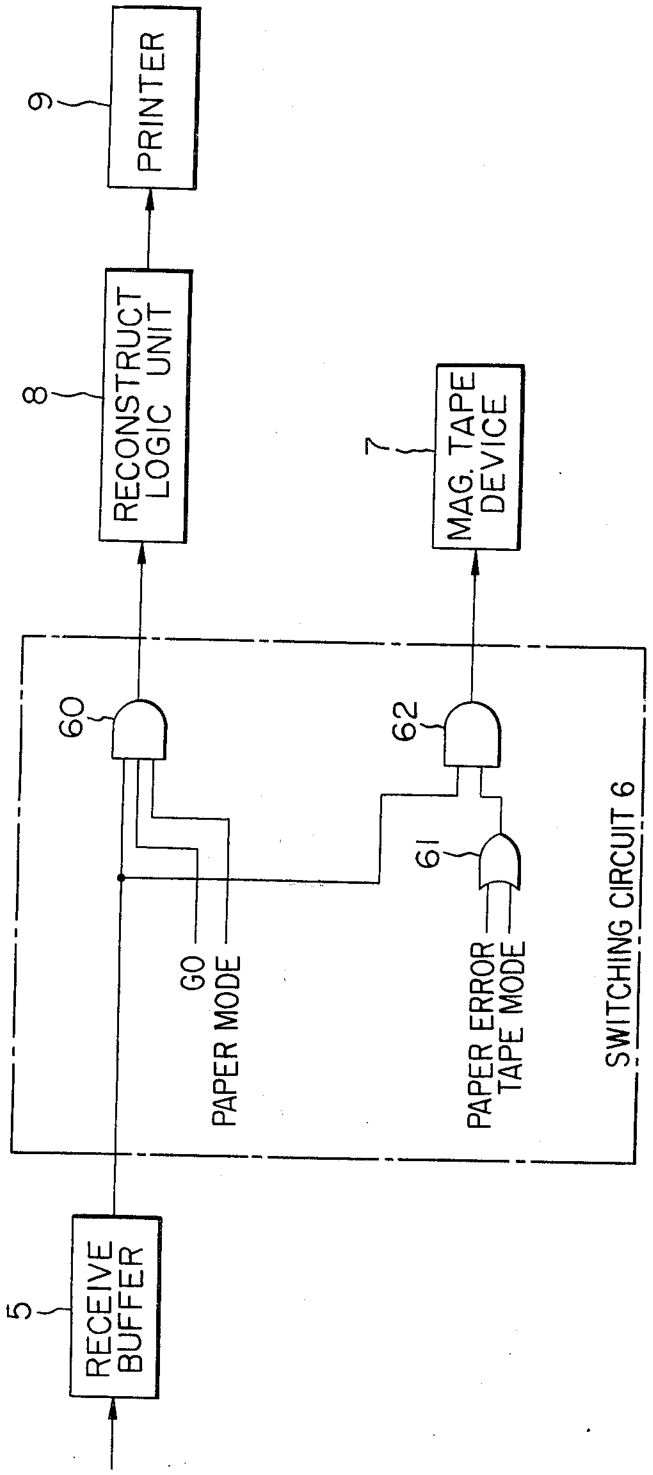
FIG. 7 is a detailed diagram of a switching circuit for selectively transferring the received video information to a printer or a magnetic tape recorder.

FIG. 7 is a detailed diagram of the switching circuit 6. When the facsimile receiver unit is in the paper made, that is the mode in which the images or pictures are reproduced on a recording paper, a gate 60 is energized as that the data stored in the buffer 5 are transferred through the reconstruction logic circuit 8 to the printer 9. In the tape mode, the tape mode signal is applied through an OR gate 61 to an AND gate 62 so that the contents of the second buffer 5 are transmitted to the magnetic tape recorder 7. When the contents of the buffer 5 are transmitted to the printer 9 as the facsimile receiver unit is in the paper mode and if the paper error signal is transmitted from the control unit 15, the go signal representing the normal operation of the printer 9 applied to the gate 60 falls to a lower level, and the paper error signal is applied to the AND gate 62 through the OR gate 61. Therefore, the gate 60 is turned off while the gate 62 is turned on so that the contents of the buffer 5 are transferred through the gate 62 to the magnetic tape recorder 7.

The above description is merely an illustration of the preferred embodiment of the present invention, and it is to be understood that various modifications can be effected without leaving the true spirit of the present invention.

What is claimed is:

1. Automatic facsimile reception system comprising a. means adapted to detect a call signal transmitted through a telephone subscriber line;

b. line connection control means adapted to establish a DC closed loop over said subscriber line in response to the detection of a call signal by said call signal detecting means;

c. receiver means adapted to receive video information transmitted through said DC closed loop from a transmitter;

d. recording means adapted to reproduce pictures or images upon a recording paper based upon said video information received by said receiver means;

e. memory means adapted to store therein said video information received by said receiver means;

f. switching means adapted to selectively switch the video information received by said receiver means to said recording means or to said memory means by selectively connecting said receiver means to said recording means or to said memory means; and g. malfunction control means adapted to cause said switching means to connect said receiver means to said memory means in response to the occurrences of a selected malfunction of said recording means while said recording means is reproducing the pictures or images based upon the video information.

2. An automatic facsimile reception system as in claim 1 wherein said memory means comprises a magnetic tape recorder.

3. An automatic facsimile reception system as in claim 1 further comprising means adapted to detect a status signal transmitted prior to said video information; and main control means adapted to set the reception system into a desired mode in response to the detection of a status signal by said status signal detecting means.

4. An automatic facsimile reception system as in claim 1 further comprising means adapted to cause said line connection control means to open said DC closed loop either upon completion of the reception of the video information or in response to a selected malfunction of the facsimile reception system.

5. An automatic facsimile reception system as in claim 4 further comprising a power supply circuit for the receiver and recording means and means adapted to turn on said power supply circuit in response to the establishment of said DC closed loop by said line connection control means and adapted to turn off said power supply circuit in response to said opening of said DC closed loop.

6. Automatic facsimile reception system comprising a. receiver means adapted to receive video information transmitted through a telephone subscriber line from a facsimile transmitter;

b. recording means adapted to reproduce the images or pictures corresponding to the received video information;

c. call signal detecting means adapted to detect a call signal transmitted over said line prior to said video information; and a power supply circuit for the recording means and control means adapted to establish a DC closed loop of said telephone subscriber line and to turn on said power supply circuit in response to the detection of a call signal by said call signal detecting means so that said video information may be received and recorded, and also adapted to turn off said DC closed loop and said power supply circuit in response to a signal transmitted over said line and representing the completion of said video information.

7. An automatic facsimile reception system as in claim 6 further comprising means adapted to detect the occurrence of a selected abnormal condition of the facsimile receiver and recording means; and means adapted to generate control signals in response to the output of said abnormal condition detecting means for thereby opening said DC closed loop and turning off said power supply circuit.

8. An automatic facsimile reception system as in claim 6 further comprising means adapted to detect a status signal transmitted prior to said video information; and main control means adapted to set the reception system into a desired mode in response to the detection of a status signal by said status signal detecting means.

9. An automatic facsimile receiver adapted to operate as a part of a facsimile system including a facsimile transmitter and a telephone subscriber line for connecting the transmitter to the receiver, comprising:

means for detecting a call signal transmitted over said telephone subscriber line from the transmitter to the receiver;

line connection control means responsive to the detection of a call signal by the detecting means for establishing a DC closed loop over said subscriber telephone line;

receiver means connected to said closed loop telephone subscriber line for receiving video information transmitted over said line;

recording means normally connected to said receiver means to receive the video information received thereby and connectable to the power supply to reproduce on recording paper an image corresponding to the received video information while connected to the power supply;

memory means connectable to said receiver means to receive therefrom said video information and to store the received video information;

means responsive to the occurrence of a first type selected malfunction in the recording means for disconnecting the recording means from the receiver means and for connecting the memory means to the receiver means for thereby storing in the memory means the video information received by the receiver means; and a power supply for the receiver and means responsive to the occurrence of a second type selected malfunction in the facsimile receiver for disconnecting said power supply therefrom.

10. A facsimile receiver as in claim 9 including means for discontinuing the DC closed loop of said subscriber telephone line in response to the occurrence of a selected malfunction in the receiver.

* * * * *